United States Patent [19]

Irons

[11] Patent Number: 4,975,115

[45] Date of Patent: Dec. 4, 1990

[54] PROCESS FOR TREATING DUST AND FUME PRODUCED BY THE BASIC OXYGEN STEELMAKING PROCESS

[75] Inventor: Stanton D. Irons, Northampton, Pa.

[73] Assignee: Bethlehem Steel Corporation, Bethlehem, Pa.

[21] Appl. No.: 249,054

[22] Filed: Sep. 26, 1988

[51] Int. Cl.$^5$ .............................. C22B 7/02; C22B 7/04
[52] U.S. Cl. ......................................... 75/330; 405/129
[58] Field of Search .................. 75/25, 24, 0.5 R, 330; 405/129

[56] References Cited

U.S. PATENT DOCUMENTS

| | | | |
|---|---|---|---|
| 3,149,964 | 9/1964 | Schwartz | 75/120 |
| 4,015,979 | 4/1977 | Fishburn et al. | 75/25 |
| 4,317,684 | 3/1982 | Hooykaas | 106/316 |
| 4,377,483 | 3/1983 | Yamashita et al. | 210/670 |
| 4,605,435 | 8/1986 | Duyvesteyn | 75/0.5 R |
| 4,652,310 | 3/1987 | Tormari et al. | 75/256 |
| 4,711,662 | 12/1987 | Harada | 75/1 |
| 4,725,307 | 2/1988 | Harada | 75/10.29 |
| 4,737,356 | 4/1988 | O'Hara et al. | 75/25 |
| 4,762,623 | 8/1988 | Kapland | 405/129 |
| 4,889,640 | 12/1989 | Stanforth | 405/129 |

*Primary Examiner*—Melvyn J. Andrews
*Attorney, Agent, or Firm*—John I. Iverson

[57] ABSTRACT

A process for conditioning basic oxygen steelmaking process dust and fume containing heavy metals for disposal. A sufficient quantity of solidified basic oxygen steelmaking process slag particles are added to the dust and fume to produce a mixture having an alkalinity substantially greater than that of the dust and fume alone. The dust and slag mixture tests as non-hazardous when tested using the toxicity test procedures for heavy metals promulgated by the United States Environmental Protection Agency (EPA).

2 Claims, No Drawings

PROCESS FOR TREATING DUST AND FUME PRODUCED BY THE BASIC OXYGEN STEELMAKING PROCESS

BACKGROUND OF THE INVENTION

This invention relates to the basic oxygen steelmaking process. It relates particularly to the handling of the dust or fume collected from the hot effluent gases emitted during the basic oxygen steelmaking process.

In the basic oxygen steelmaking process (BOP), a tiltable, barrel shaped furnace is charged with controlled amounts of ferrous scrap and molten iron. The furnace is then turned upright and a water-cooled oxygen lance is lowered into the furnace to a predetermined position above the surface of the bath. Gaseous oxygen from the lance starts a number of chemical reactions in the furnace to melt the scrap and refine the iron into steel. Slag forming fluxes, such as lime, fluorspar and mill scale are added in controlled amounts to produce a molten slag which aids in the refining process.

The BOP produces large amounts of hot gases, primarily CO and $CO_2$, and generates large quantities of dust or fume in the effluent given off from the furnace. The gases must be cooled and the dust and fume collected and removed from the effluent before the effluent is discharged to the atmosphere.

The dust is collected in large dust collectors such as precipitators and then stored in bins or silos until it can be disposed. The amount of dust produced by the BOP is considerable. In a typical BOP facility, almost 2 tons of dust are collected for every 100 tons of steel produced. Federal, state and local laws and regulations require that the large quantities of BOP dust must be stored, handled and disposed so that they are not a threat to the environment.

While BOP dust is primarily iron oxide, it often contains nonferrous metals, such as copper, zinc, lead, chromium, cadmium, etc., some of which are considered hazardous to the environment by the U.S. Environmental Protection Agency (EPA) if these nonferrous metals were permitted to leach into the environment and, therefore, require special handling and disposal. In order for the BOP dust to be considered non-hazardous by the EPA, the dust must not fail the EPA toxicity protocol (EPTOX) for eight potentially leachable heavy metals. Changes in the chemistry of the BOP dust and the alkalinity of the dust may affect such EPTOX test results. If the amount of each of the heavy metals measured in the leachate exceeds the limits set by the EPA, the dust would be considered by the EPA to be a hazardous waste that will require special handling and disposal. The nonferrous metals ("tramp metals") in the BOP dust are usually traceable to the scrap used in the steelmaking process. The amount of tramp metals in the dust is directly related to the quality of the scrap used. The best quality and most expensive scrap contains very few tramp metals. Poorer quality and less expensive scrap contains a higher Percentage of the tramp metals.

Steelmakers have been faced with a dilemma resulting from their desire to use a less expensive scrap in an effort to reduce costs. The use of the poorer quality and, therefore, less expensive scrap produces BOP dust which contains appreciable amounts of the tramp metals. Some of the BOP dusts containing these tramp metals may be hazardous when tested by EPA standards and, therefore, require more difficult and expensive forms of storage, handling and disposal of the BOP dust.

SUMMARY OF THE INVENTION

It is an object of this invention to provide a method for conditioning BOP dust and fume containing heavy "tramp" metals to allow disposal as a non-hazardous waste material.

It is a further object of this invention to provide a method for the safe handling and disposal of BOP dust and fume.

It is a still further object of this invention to provide a process that will enable a steelmaker to use larger quantities of scrap containing heavy "tramp" metals than would otherwise be possible.

It is a still further object of this invention to provide a process for a synergistic utilization of several waste materials generated in a BOP facility.

Other features, advantages and objects of this invention will become apparent to those skilled in the art reading the following description.

The method of this invention essentially comprises adding to a quantity of BOP dust or fume, a sufficient quantity of solidified BOP slag particles to produce a mixture having an alkalinity sufficient that when tested using the toxicity test procedures for heavy metals promulgated by the EPA produces a leachate of pH 7 or greater.

DESCRIPTION OF A PREFERRED EMBODIMENT

BOP dust or fume collected from the effluent of a basic oxygen process furnace comprise primarily fine particles of iron oxide but may contain other metals such as copper, zinc, lead, chromium, cadmium, etc. A typical composition of BOP dust is as follows:

| Constituent | Weight % |
|---|---|
| Fe | 59.4 |
| Zn | 0.31 |
| Pb | 0.05 |
| S | 0.16 |
| CaO | 8.0 |
| $K_2O$ | 1.0 |
| $Ni_2O$ | 0.06 |
| Cl | 0.06 |
| P | 0 |
| MgO | 1.0 |
| $SiO_2$ | 2.0 |
| $Al_2O_3$ | <.1 |
| LOI | 1.2 |

BOP dust or fume in a distilled water solution is basic and has a typical pH of about 10 to 12.

Steelmakers in the United States of America are required by the U.S. Environmental Protection Agency (EPA) regulations to test steelmaking solid wastes, such as BOP dust, according to "Test Methods for Evaluating Solid Waste; Laboratory Manual Physical/Chemical Methods, SW 846", published by the EPA November 1986, 3rd Edition, Volume 1, Section C, Chapter 8, Method 1310 "Extraction Procedure Toxicity Test Method and Structural Integrity Test". The procedures used in this test are described in Columns 6 and 7 of U.S. Pat. No. 4,737,356 to O'Hara, et al. and are incorporated by reference thereto in this description. If the leachate produced using this EPA test procedure known as the "EPTOX Leachate Test" contains heavy metals such as lead, chromium and cadmium in amounts greater than allowed by EPA regulations, the waste material is classified hazardous by EPA and must be handled and disposed using special procedures and permits. At the present time, the EPA limits the heavy metals in the leachate to lead −5 mg/l; cadmium −1 mg/l and chromium 5 mg/l.

The basic oxygen steelmaking process also produces a slag which when molten in the furnace aids in the steel refining process but which is normally discarded after the steel is produced. The solidified slag which is essentially calcium silicates, have iron compounds with small amounts of free lime and magnesia. Small amounts of this slag can be recycled to a blast furnace to recover the iron units they contain and for fluxing purposes in the blast furnace but in most steel plants most of the BOP slag is air cooled until solidified and dumped as a waste material. A typical composition for a BOP slag is as follows:

| Constituent | Weight % |
|---|---|
| FeO | 10.2 |
| MnO | 6.6 |
| $SiO_2$ | 20.8 |
| $Al_2O_3$ | 4.2 |
| MgO | 6.3 |
| CaO | 44.1 |

BOP slag in a distilled water solution is basic and has a typical pH of about 10 to 11.

We have discovered a way to be certain that BOP dusts will pass the above-described EPTOX leachate test by mixing with the dust a sufficient quantity of small sized (less than ¼ inch mesh) solidified BOP slag particles to produce a mixture having an increased alkalinity sufficient that the EPTOX leachate has a pH of 7 or greater. While other alkaline materials could be added to BOP dust to produce a mixture having an increased alkalinity, the use of materials resulting from the BOP process itself is not only economical but uses two waste materials from the same process to prevent the creation of a hazardous waste. The addition of materials that are not part of the BOP process would be more costly and might require special EPA treatment permits. The mixture should then be mixed sufficiently in a powered mixer to insure a homogenous mixture of BOP dust and BOP slag. If the mixing produces too much dust, a small amount of water may be added to the mixture.

SPECIFIC EXAMPLES

Example 1

Laboratory additions of fine BOP slag particles to BOP dust were made at 5%, 10%, 20% and 30% by weight of the total mix and EPTOX leachate was monitored for leachable lead. The data in Table 1 show that an inverse relationship exists between % slag addition and leachable lead (increasing the % slag decreases the leachable lead). Moreover, for additions of slag greater than 20%, the leachable lead content approaches the minimum detectable limit by flame photometry analysis.

TABLE 1

EPTOX EVALUATION OF BOP SLAG FINES AND BOP DUST MIXES - A LABORATORY STUDY

| Test | Mix | EPTOX Test Initial pH | EPTOX Test Final pH | Leachate Evaluation Pb (mg/liter) |
|---|---|---|---|---|
| #1 | 100 gms BOP Dust Incremental Sample (high lead) | 12.2 | 5.2 | 12-13 |
| #2 | 5% Slag Fines 95.2 gms BOP Dust 4.8 gms BOP Slag Fines | 11.8 | 5.8 | 4.3 |
| #3 | 10% Slag Fines 90.9 gms BOP Dust 9.1 gms BOP Slag Fines | 11.0 | 6.3 | 1.1 |
| #4 | 20% Slag Fines 83.3 gms BOP Dust 16.7 gms BOP Slag Fines | 11.3 | 8.7 | 0.2 |
| #5 | 30% Slag Fines 76.9 gms BOP Dust 23.1 gms BOP Slag Fines | 11.2 | 8.2 | 0.2 |

Example 2

Samples of BOP dust were spiked with high lead electric furnace dust to simulate a high lead sample of BOP dust since at the time no high lead BOP dust could be collected for the test. The mixture data are shown in Table 2, and the EPA leachate test data show the positive effects of adding BOP slag fines. Because of the extremely high lead content in the mixed samples greater amounts of slag (>50% by weight of total weight) were required to enhance the spiked samples.

TABLE 2

EPTOX TEST OF BOP SLAG FINES, BOP DUST, AND SPIKE MIXES - A LABORATORY STUDY

| Evaluation Test | Mix | Initial pH | Final pH | Leachate Pb (mg/liter) |
|---|---|---|---|---|
| #100 | 100 gms BOP Dust | 12.2 | 5.2 | 18.0 |
| #101 | 100 gms Electric** | 7.3 | 7.0 | 165.0 |
| #102 | 86.5 gms BOP Dust 13.5 gms Electric** | 11.7 | 6.9 | 106.0 |
| #109 | 94.0 gms BOP Dust 6.0 gms Electric** | 10.5 | 6.1 | 64.0 |
| #105 | 10% Slag Addition 9.1 gms BOP Slag 78.7 gms BOP Dust 12.1 gms Electric** | 12.1 | 7.05 | 50.0 |
| #104 | 20% Slag Addition 16.7 gms BOP Slag 72.1 gms BOP Dust 11.2 gms Electric** | 12.4 | 7.10 | 34.0 |
| #106 | 30% Slag Addition 23.1 gms BOP Slag 66.5 gms BOP Dust 10.4 gms Electric** | 12.1 | 7.05 | 16.0 |

TABLE 2-continued

EPTOX TEST OF BOP SLAG FINES, BOP DUST, AND SPIKE MIXES - A LABORATORY STUDY

| Evaluation Test | Mix | Initial pH | Final pH | Leachate Pb (mg/liter) |
|---|---|---|---|---|
| #107 | 40% Slag Addition | 12.1 | 7.15 | 9.0 |
|  | 28.6 gms BOP Slag |  |  |  |
|  | 61.8 gms BOP Dust |  |  |  |
|  | 9.6 gms Electric** |  |  |  |
| #108 | 50% Slag Addition | 12.0 | 7.25 | 5.0 |
|  | 33.3 gms BOP Slag |  |  |  |
|  | 57.7 gms BOP Dust |  |  |  |
|  | 9.0 gms Electric** |  |  |  |

**Electric Arc Furnace Fume, High in Leachable Pb

Example 3

Several 24 hour Multiple Extraction tests (MEP) were conducted at the 10% slag addition level to simulate the effect of several acid rains leaching the material store din a landfill. Data on this study for six continuous days show that leachable lead does not increase with successive leaches.

TABLE 3

MEP EVALUATION OF BOP SLAG FINES AND BOP DUST MIXES - A LABORATORY STUDY

|  | Test 204 100 gms BOP Dust | Test 205 90.9 gms BOP Dust 9.1 gms BOP Slag | Test 206 90.9 gms BOP Dust 9.1 gms BOP Slag |
|---|---|---|---|
| EPTOX Leachate |  |  |  |
| Initial/Final pH | 12.2/5.3 | 12.2/6.5 | 12.2/6.0 |
| Pb (mg/liter) | 1.6 | 0.03 | 0.07 |
| MEP #1 Initial/Final pH | 4.4/5.8 | 5.3/7.1 | 4.9/6.6 |
| Pb (mg/liter) | <.01 | <.01 | <.01 |
| MEP #2 Initial/Final pH | 3.5/5.7 | 4.6/6.6 | 4.4/6.6 |
| Pb (mg/liter) | <.01 | <.01 | <.01 |
| MEP #3 Initial/Final pH | 4.1/6.8 | 5.2/8.4 | 3.9/8.6 |
| Pb (mg/liter) | <.01 | <.01 | <.01 |
| MEP #4 Initial/Final pH | 4.0/6.4 | 6.3/8.2 | 6.7/8.7 |
| Pb (mg/liter)** | <.01 | <.01 | <.01 |
| MEP #5 Initial/Final pH | 4.0/6.4 | 5.9/8.1 | 7.2/8.6 |
| Pb (mg/liter) | .01 | .02 | <.01 |

**2 day interval between MEP #3 and MEP #4

Example 4

An experimental pilot circuit for adding and mixing about 5TPH of BOP slag fines to about 18TPH of BOP dust was operated for about 1 year at a steel plant. During this time, samples were taken to assess the characteristics of the dust slag mixture as defined by the EPTOX test. Typical data from the operations of this process are given in Table 4.

TABLE 4

EPTOX TEST RESULTS ON SAMPLES COLLECTED FROM STEEL PLANT 18TPH DUST/SLAG MIXING SYSTEM

| Sample Date | EPTOX Initial pH | EPTOX Final pH | Leachate Characteristics | | |
|---|---|---|---|---|---|
| | | | mg/liter Pb | mg/liter Cd | mg/liter Cr |
| 7/10/87 | 11.8 | 10.0 | <.1 | <.02 | <.05 |
| 7/24/87 | 11.7 | 8.7 | <.1 | <.02 | <.05 |
| 8/11/87 | 11.8 | 8.5 | <.1 | .03 | <.05 |
| 12/29/87 | 11.9 | 8.8 | <.1 | <.02 | <.05 |
| 11/14/88 | 12.0 | 8.5 | <.1 | .06 | <.05 |
| 7/16/88 | 11.7 | 8.2 | <.1 | .10 | <.05 |
| 7/12/88 | 11.8 | 8.0 | <.1 | .09 | <.05 |
| 12/26/87 | 12.0 | 7.8 | <.1 | .20 | <.05 |
| 1/03/88 | 12.0 | 7.6 | <.1 | .25 | <.05 |
| 7/22/87 | 11.7 | 7.4 | <.1 | .32 | <.05 |
| 12/24/87 | 12.0 | 7.0 | <.1 | .81 | <.05 |
| 1/05/88 | 12.0 | 7.0 | <.1 | .52 | <.05 |
| 1/04/88 | 12.0 | 6.4 | <.1 | 1.20 | NA |
| 1/05/88 | 11.8 | 5.9 | .4 | 1.30 | NA |
| 1/05/88 | 11.8 | 5.6 | .7 | 1.70 | NA |

These data show that, in general, the leachate from the EPTOX test procedure will test non-hazardous when the pH of the final leachate is about 7 or greater.

This process has enabled the steelmaker to increase the amount of low cost scrap that can be added to the furnace than was possible before without producing a hazardous waste that would require special handling and disposal. Initial trials indicate that up to 3 times as much No. 2 scrap can be added than was possible before this process was available to treat the BOP dust. This process results in a synergistic effect between the BOP dust or fume and the BOP slag which allows both of them to be handled and disposed of safely and in accordance with EPA regulations.

I claim:

1. A method of conditioning substantially dry, solid basic oxygen steelmaking process dust containing heavy metals to allow its safe disposal by adding to said dust a sufficient quantity of solidified basic oxygen steelmaking process slag particles to produce a free-flowing granular mixture which when subjected to an EPTOX test produces a leachate having a pH of 7 or greater.

2. The method of claim 1 in which the slag particles will all pass through a ¼" screen.

* * * * *